United States Patent [19]
Baulier et al.

[11] Patent Number: 6,163,604
[45] Date of Patent: Dec. 19, 2000

[54] AUTOMATED FRAUD MANAGEMENT IN TRANSACTION-BASED NETWORKS

[75] Inventors: Gerald Donald Baulier, Stanhope; Michael H. Cahill, New Providence; Virginia Kay Ferrara, Middletown; Diane Lambert, Berkeley Heights, all of N.J.

[73] Assignee: Lucent Technologies, Murray Hill, N.J.

[21] Appl. No.: 09/283,672

[22] Filed: Apr. 1, 1999

Related U.S. Application Data

[60] Provisional application No. 60/080,006, Apr. 3, 1998.

[51] Int. Cl.[7] .................................................... H04M 3/00
[52] U.S. Cl. .......................................... 379/189; 379/145
[58] Field of Search ................................... 379/189, 145, 379/111, 112, 113

[56] References Cited

U.S. PATENT DOCUMENTS

| | | | |
|---|---|---|---|
| 4,799,255 | 1/1989 | Bilinger et al. | 379/189 |
| 5,345,595 | 9/1994 | Johnson et al. | 455/33.1 |
| 5,357,564 | 10/1994 | Gupta et al. | 379/188 |

(List continued on next page.)

FOREIGN PATENT DOCUMENTS

| | | | |
|---|---|---|---|
| 0 618 713 A2 | 10/1994 | European Pat. Off. | H04M 3/22 |
| 0 653 868 A2 | 5/1995 | European Pat. Off. | H04M 3/42 |
| 0 661 863 A2 | 7/1995 | European Pat. Off. | H04M 15/00 |
| 2 303 275 | 2/1997 | United Kingdom | H04Q 7/38 |
| WO 97/37486 | 10/1997 | WIPO | H04M 15/00 |
| WO 99/05844 | 2/1999 | WIPO | H04M 3/36 |

OTHER PUBLICATIONS

Moreau, Y. et al., "Detection of Mobile Phone Fraud Using Supervised Neural Networks: A First Prototype", *Artificial Neural Networkls—ICANN '97*, Proceedings of the 7th International Conference, Oct. 8–10, 1997, pp. 1065–1070.

Baulier, G. D. et al. "Sunrise: A Real–Time Event–Proceessing System", *Bell Labs Technical Journal*, Jan.–Mar. 1998, pp. 3–18.

Fawcett, T. et al., "Adaptive Fraud Detection", *Data Mining and Knowledge Discovery* (1997), pp. 291–316.

Ezawa, K. J. et al., "Knowledge Discovery in Telecommunications Services Data Using Bayesian Network Models", KDD–95, pp. 100–105.

U.S patent application Ser. No. 09/276,339 (Baulier 2-2-1-1-9-1-46-1).

U.S.patent application Ser. No. 09/253,673 (Baulier 4-2-2-5).

*Primary Examiner*—Creighton Smith
*Attorney, Agent, or Firm*—Gregory J. Murgia

[57] ABSTRACT

Fraud losses in a communication network are substantially reduced by automatically generating fraud management recommendations in response to suspected fraud and by deriving the recommendations as a function of selected attributes of the fraudulent activity. More specifically, a programmable rules engine automatically generates recommendations based on call-by-call fraud scoring so that the recommendations correspond directly to the type and amount of suspected fraudulent activity. Using telecommunications fraud as an example, an automated fraud management system receives call detail records that have been previously scored to identify potentially fraudulent calls. Fraud scoring estimates the probability of fraud for each call based on the learned behavior of an individual subscriber as well as that of fraud perpetrators. Scoring also provides an indication of the contribution of various elements of the call detail record to the fraud score for that call. A case analysis is initiated and previously scored call detail records are separated into innocuous and suspicious groups based on fraud scores. Each group is then characterized according to selected variables and scoring for its member calls. These characterizations are combined with subscriber information to generate a set of decision variables. A set of rules is then applied to determine if the current set of decision variables meets definable conditions. When a condition is met, prevention measures associated with that condition are recommended for the account. As one example, recommended prevention measures may be automatically implemented via provisioning functions in the telecommunications network.

31 Claims, 6 Drawing Sheets

U.S. PATENT DOCUMENTS

| | | | |
|---|---|---|---|
| 5,375,244 | 12/1994 | McNair | 395/725 |
| 5,448,760 | 9/1995 | Frederick | 455/56.1 |
| 5,495,521 | 2/1996 | Rangacher | 379/95 |
| 5,504,810 | 4/1996 | McNair | 3799/189 |
| 5,506,893 | 4/1996 | Buscher | 379/114 |
| 5,566,234 | 10/1996 | Reed et al. | 379/188 |
| 5,602,906 | 2/1997 | Phelps | 379/114 |
| 5,627,886 | 5/1997 | Bowman | 379/111 |
| 5,706,338 | 1/1998 | Relyea et al. | 379/189 |
| 5,768,354 | 6/1998 | Lange et al. | 379/189 |
| 5,819,226 | 10/1998 | Gopinathan et al. | 705/1 |

| VARIABLE | DESCRIPTION |
|---|---|
| ACCOUNT AGE | AGE OF ACCOUNT |
| ACCOUNT TYPE | INDICATOR OF ACCOUNT TYPE (BUSSINESS, RESIDENCE, etc.) |
| CREDIT RATING | CUSTOMER'S CREDIT RATING |

| VARIABLE | DESCRIPTION |
|---|---|
| **** | ANY CALL SUMMARY VARIABLE OR COMBINATION OF VARIABLES FROM FIG. 4 |
| ACCOUNT AGE | AGE OF ACCOUNT |
| PREVIOUS FALSE ALARMS | COUNT OF PREVIOULY OPENED CASES THAT WERE NOT FRAUD |
| ACCOUNT TYPE | INDICATOR OF ACCOUNT TYPE (BUSINESS, RESIDENCE, etc.) |
| CREDIT RATING | CUSTOMER'S CREDIT RATING |
| ALERT COUNTS | COUNTS OF PROFILE DEVIATION ALERTS AND COLLISION/VELOCITY VIOLATION ALERTS |

FIG.5B

| | VARIABLE | PER | DESCRIPTION |
|---|---|---|---|
| 410 | FIRST ALERT AT | CASE | TIME OF FIRST HIGH SCORING CALL |
| | CASE SCORE | CASE | TOTAL CASE SCORE |
| 420 | NUMBER OF CALLS | SET | TOTAL NUMBER OF CALLS IN SET |
| | TOTAL MINUTES | SET | SUM OF DURATIONS OF ALL CALLS IN SET |
| | CF COUNT | SET | SUM OF CALLS IN SET IN WHICH CALL FORWARDING WAS APPLIED |
| | TWC COUNT | SET | SUM OF CALLS IN WHICH THREE-WAY CALLING OR TRANSFER WAS APPLIED |
| | OP COUNT | SET | SUM OF CALLS IN SET IN WHICH OPERATOR SERVICES WERE REQUESTED |
| | ROAMING COUNT | SET | SUM OF CALLS IN SET IN WHICH ORIGINATION IS ROAMING LOCATION (WIRELESS ONLY) |
| | INTERNATIONAL COUNT | SET | SUM OF CALLS IN SET IN WHICH CALLED NUMBER IS INTERNATIONAL |
| 421 | HOT NUMBER COUNT | SET | SUM OF CALLS IN SET IN WHICH CALLED NUMBER IS MEMBER OF EDITABLE HOT NUMBER LIST |
| 430 | DAY SCORE DIST | SET | PROBABILITY DISTRIBUTION OF X FOR ALL CALLS IN SET, WHERE X IS CONTRIBUTION OF DAY OF WEEK TO THE SCORE OF THE CALL. NUMBER OF ELEMENTS IN DISTRIBUTION CONFIGURATION. ["CONTRIBUTION DIST. OF DAY OF WEEK"] |
| 431 | HOUR SCORE DIST | SET | CONTRIBUTION DIST OF HOUR OF DAY |
| | DURATION SCORE DIST | SET | CONTRIBUTION DIST OF DURATION |
| | TBC SCORE DIST | SET | CONTRIBUTION DIST OF TIME BETWEEN CALLS |
| | DIALING SCORE DIST | SET | CONTRIBUTION DIST OF DIALING |
| | CW SCORE DIST | SET | CONTRIBUTION DIST OF CALL WAITING USE |
| | TWC SCORE DIST | SET | CONTRIBUTION DIST OF THREE-WAY CALLING/TRANSFER USE |
| | OPERATOR SCORE DIST | SET | CONTRIBUTION DIST OF OPERATOR REQUEST |
| | CF SCORE DIST | SET | CONTRIBUTION DIST OF CALL FORWARDING USE |
| | ORIGINATION SCORE DIST | SET | CONTRIBUTION DIST OF ORIGINATION LOCATION |
| | ROAMING SCORE DIST | SET | CONTRIBUTION DIST OF OCCURRENCE OF ROAMING (WIRELESS ONLY) |
| | HANDOFF SCORE DIST | SET | CONTRIBUTION DIST OF HANDOFF COUNT |
| | SECURITY SCORE DIST | SET | CONTRIBUTION DIST OF NETWORK SECURITY ALERTS |
| | CARRIER SCORE DIST | SET | CONTRIBUTIONS DIST OF CARRIER SELECTION |
| | INTERNATIONAL SCORE DIST | SET | CONTRIBUTION DIST OF INTERNATIONAL SERVICE USE |

| ACTION | DESCRIPTION AND PARAMETERS |
|---|---|
| BLOCK PIN | BLOCKS ONE USER OF A MULTI-USER WIRELESS OR CARD ACCOUNT. PARAMETERS: PIN, ESN OR SUB-ACCOUNT |
| BLOCK ACCOUNT | BLOCKS ALL ACCOUNT ACTIVITY PARAMETERS: NONE |
| BLOCK MARKET | BLOCKS USE OF WIRELESS OR CARD ACCOUNT FROM PARTICULAR AREAS PARAMETERS: AREA LIST |
| BLOCK DIALING | BLOCKS INTERNATIONAL DIALING PARAMETERS: NONE |
| BLOCK SERVICE | BLOCK USE OF CALL FORWARDING OF THREE-WAY CALLING/TRANSFER PARAMETERS: SERVICE TO BE BLOCKED |
| SET INTERCEPT | CAUSES NEXT SUSPICIOUS CALL TO BE ROUTED TO AN ATTENDANT OR SYSTEM PARAMETERS: ATTENDANT OR SYSTEM |
| QUEUE | PLACES CASE IN PARTICULAR QUEUE FOR HUMAN INVESTIGATION PARAMETERS: QUEUE ID |
| JUDGE | CATEGORIZES CASE AS SUSPECTED LEGIT, FRAUD OR SUBSCRIPTION FRAUD PARAMETERS: JUDGEMENT |
| NOTIFY | GENERATES ALARM THAT CASE SHOULD BE INVESTIGATED IMMEDIATELY PARAMETERS: NONE |

AUTOMATED FRAUD MANAGEMENT IN TRANSACTION-BASED NETWORKS

CROSS-REFERENCE TO RELATED APPLICATIONS

This application claims the benefit of U.S. Provisional Application Ser. No. 60/080,006 filed on Apr. 3, 1998, which is herein incorporated by reference. This application is also related to U.S. Application Ser. No. 09/283,673 filed Apr. 2, 1999 which is incorporated by reference herein.

TECHNICAL FIELD

This invention relates generally to fraud management and, more specifically, to an automated approach for managing fraud in transaction-based networks, such as communication networks and the like.

BACKGROUND OF THE INVENTION

Fraudulent use of communication networks is a problem of staggering proportions. Using telecommunications networks as an example, costs associated with fraud are estimated at billions of dollars a year and growing. Given the tremendous financial liability, the telecommunications industry continues to seek ways for reducing the occurrence of fraud while at the same time minimizing disruption of service to legitimate subscribers.

Although there are many forms of telecommunications fraud, two of the most prevalent types or categories of fraud in today's networks are theft-of-service fraud and subscription fraud. For example, theft-of-service fraud may involve the illegitimate use of calling cards, cellular phones, or telephone lines (e.g., PBX lines), while subscription fraud may occur when a perpetrator who never intends to pay for a service poses as a new customer. This latter type of fraud has been particularly difficult to detect and prevent because of the lack of any legitimate calling activity in the account that could otherwise be used as a basis for differentiating the fraudulent activity. In either case, losses attributable to these types of fraud are a significant problem.

Many companies boast of superior fraud management in their product offerings; however, the fact remains that a comprehensive fraud management system does not exist which addresses the operational and economic concerns of service providers and customers alike. For example, a common disadvantage of most systems is that detection of fraud occurs after a substantial amount of fraudulent activity has already occurred on an account. Moreover, many fraud prevention measures implemented in today's systems are quite disruptive to the legitimate customer. As a result, customer "churn" may result as customers change service providers in search of a more secure system.

In general, the shortcomings of prior systems are readily apparent in terms of the amount of time that is required to detect and respond to fraud. For example, fraud detection based on customer feedback from monthly bills is not an acceptable approach to either service providers or customers. Automated fraud detection systems based on "thresholding" techniques are also not particularly helpful in managing fraud on a real-time or near real-time basis. For example, thresholding typically involves aggregating traffic over time (e.g., days, weeks, months), establishing profiles for subscribers (e.g., calling patterns), and applying thresholds to identify fraud. These systems are not viewed as being particularly effective because legitimate users can generate usage that exceeds the thresholds and the amount of fraud that can occur prior to detection and prevention is high (see, e.g., U.S. Pat. No. 5,706,338, "Real-Time Communications Fraud Monitoring System" and U.S. Pat. No. 5,627,886, "System and Method for Detecting Fraudulent Network Usage Patterns Using Real-Time Network Monitoring").

Although speed in detecting fraud may be improved by using technologies such as neural networking, statistical analysis, memory-based reasoning, genetic algorithms, and other data mining techniques, improved fraud detection alone does not completely solve the problem. In particular, even though systems incorporating these techniques may receive and process individual call data on a near real-time basis in an attempt to detect fraud, these systems still do not respond to the detected fraud on a real-time or near real-time basis. In one example, a system may generate an alert to an investigator in a network monitoring or operations center. However, the alerts will generally not be examined or acted upon immediately, thereby resulting in a significant amount of latency in responding to the detected fraud. Because of the reactive nature of these systems in responding to detected fraud, a considerable amount of financial loss is still incurred by service providers and customers after the alert is generated. Furthermore, automated prevention based on inaccurate detection will result in the disruption of service to legitimate subscribers.

SUMMARY OF THE INVENTION

Fraud losses in a communications network are substantially reduced according to the principles of the invention by automatically generating fraud management recommendations in response to suspected fraud and by deriving the recommendations as a function of selected attributes of the fraudulent activity, legitimate activity, and subscriber background information. More specifically, a programmable rules engine is used to automatically generate recommendations for responding to fraud based on call-by-call scoring so that the recommendations correspond directly to the type and amount of suspected fraudulent activity. By automatically generating more precise fraud responses, fraud management according to the principles of the invention is much more effective in meeting operational, financial, and customer satisfaction requirements as compared to prior arrangements where a case may sit in a queue until a human investigator analyzes it and makes a determination on what action to take. Automated fraud management according to the principles of the invention results in significant cost savings both in terms of reduced fraud losses as well as less resources required for investigating suspected fraud. Moreover, investigation time is reduced thus improving response time to suspected fraud.

In one illustrative embodiment for managing telecommunications fraud, an automated fraud management system receives call detail records that have been scored to identify potentially fraudulent calls. Fraud scoring estimates the probability of fraud for each call based on the learned behavior of an individual subscriber and the learned behavior of fraud perpetrators. Importantly, scoring provides an indication of the contribution of various elements of the call detail record to the fraud score for that call. A case analysis is initiated and previously scored call detail records are separated into innocuous and suspicious groups based on fraud scores. Each group is then characterized according to selected variables and scoring for its member calls. These characterizations are combined with subscriber information to generate a set of decision variables. A set of rules is then applied to determine if the current set of decision variables meets definable conditions. When a condition is met, prevention measures associated with that condition are recommended for the account. As one example, recommended prevention measures may be implemented automatically via provisioning functions in the telecommunications network.

According to another aspect of the invention, automated fraud management based on call-by-call scoring facilitates a continuous updating feature. For example, active cases can be re-evaluated as new calls are scored and added to a case. Moreover, a case may be updated as new recommendations are generated.

BRIEF DESCRIPTION OF THE DRAWING

A more complete understanding of the present invention may be obtained from consideration of the following detailed description of the invention in conjunction with the drawing, with like elements referenced with like reference numerals, in which:

FIG. 5B is an exemplary listing of scored call variables that can be used according to the principles of the invention;

DETAILED DESCRIPTION OF THE INVENTION

Although the illustrative embodiments described herein are particularly well-suited for managing fraud in a telecommunications network, and shall be described in this exemplary context, those skilled in the art will understand from the teachings herein that the principles of the invention may also be employed in other non-telecommunications transaction-based networks. For example, the principles of the invention may be applied in networks that support on-line credit card transactions, internet-based transactions, and the like. Consequently, references to "calls" and "call detail records" in a telecommunications example could be equated with "transactions" and "transaction records", respectively, in a non-telecommunications example, and so on. Accordingly, the embodiments shown and described herein are only meant to be illustrative and not limiting.

Figure 1:
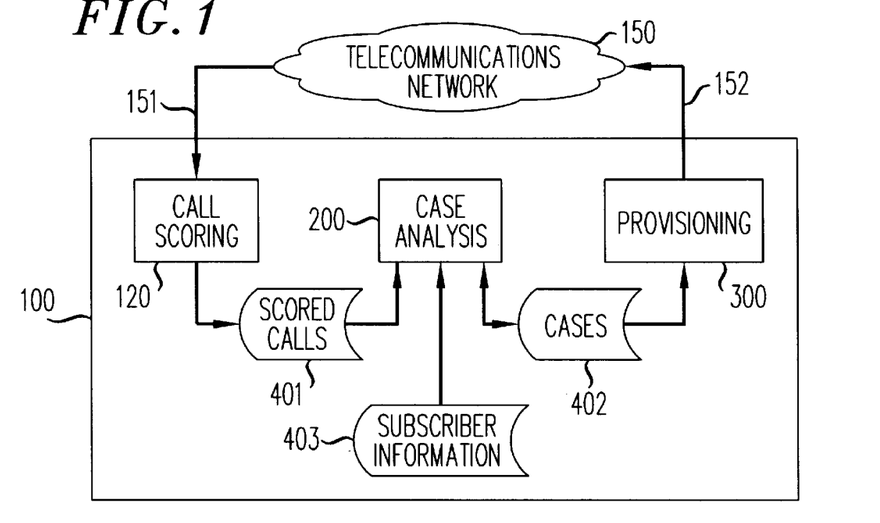
FIG. 1 is a simplified block diagram illustrating one embodiment of the invention for managing fraud in a telecommunications network.

FIG. 1 shows one illustrative embodiment of the invention for managing fraud in a typical telecommunications network. More specifically, system 100 is configured to perform various functions and operations to respond to suspected fraudulent activity in telecommunications network 150. As shown, system 100 comprises call scoring function 120, case analysis function 200, and provisioning function 300. To enable these functions, system 100 stores data including, but not limited to, scored call details 401, stored cases 402, and subscriber account information 403. It will be appreciated that system 100 can be implemented in one illustrative embodiment using computer hardware and software programmed to carry out these functions and operations, each of which is described below in further detail.

As is well known, a telecommunications network such as network 150 generates call detail records for each call processed within the network. According to the principles of the invention, these call detail records are supplied via path 151 to call scoring function 120 within system 100 so that each call can be scored to determine the likelihood of fraud for that particular call. The resultant scored call details are stored as shown in block 401 for later use and are also forwarded to case analysis function 200 for processing. As used herein, the term "case" is meant to represent a potential fraud case that may be developing on a billed account, an originating line/equipment account, a terminating line/equipment account for the call, and the like.

As shown, case analysis function 200 receives scored call details as well as subscriber account information (block 403), examples of which could include the type of account (business, residential), customer's credit rating, customer's credit limit, past billing treatment indicators, date the account was established, and so on. As a result of case analysis, case details are stored as shown in block 402. Additionally, recommendations are automatically generated for responding to suspected fraud on an account. These recommended fraud responses may, for example, include specific prevention measures that correspond to the type and amount of suspected fraudulent activity. As shown in the example of FIG. 1, recommended fraud responses resulting from case analysis function 200 may include responses that can be implemented via provisioning function 300, which is coupled to network 150 via path 152. Well known techniques may be used for provisioning network 150 to respond in a particular way to a particular activity on a call, e.g., block the call, disable call forwarding for this account, and so on.

Figure 2:
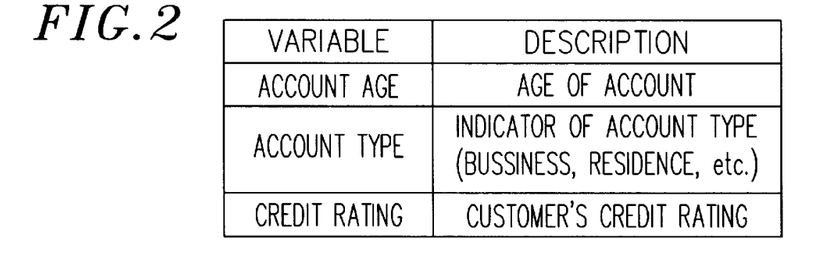
FIG. 2 is an exemplary listing of subscriber information that can be used according to the principles of the invention.

FIG. 1 further illustrates the iterative and adaptive aspects of the invention with respect to call scoring and case analysis. More specifically, an already active case (e.g., stored in block 402) can be re-evaluated as new calls are scored and added to the case. A case may also be updated as new recommendations are generated as a result of case analysis. For example, call detail records are continually being supplied via path 151 to call scoring function 120. Newly scored calls can then be provided to case analysis function 200 along with previously scored calls stored as shown in block 401. Again, case analysis function 200 analyzes the scored call data in combination with subscriber information (block 403). The table in FIG. 2 shows a listing of some examples of subscriber account information that may be used in case analysis. However, these examples are meant to be illustrative only and not limiting in any way.

Returning to FIG. 1, case analysis function 200 may also retrieve an active case (e.g., previously stored in block 402) for further analysis in view of newly scored calls as well as subscriber information (block 403). New recommendations generated by case analysis function 200 may also be added to the already active case. As shown, provisioning measures (block 300) may be implemented as a result of new recommendations generated by case analysis function 200 or as a result of previously generated recommendations associated with a previously stored case (block 402). In this way, automated fraud management according to the principles of the invention allows for continuous updating.

Figure 3:
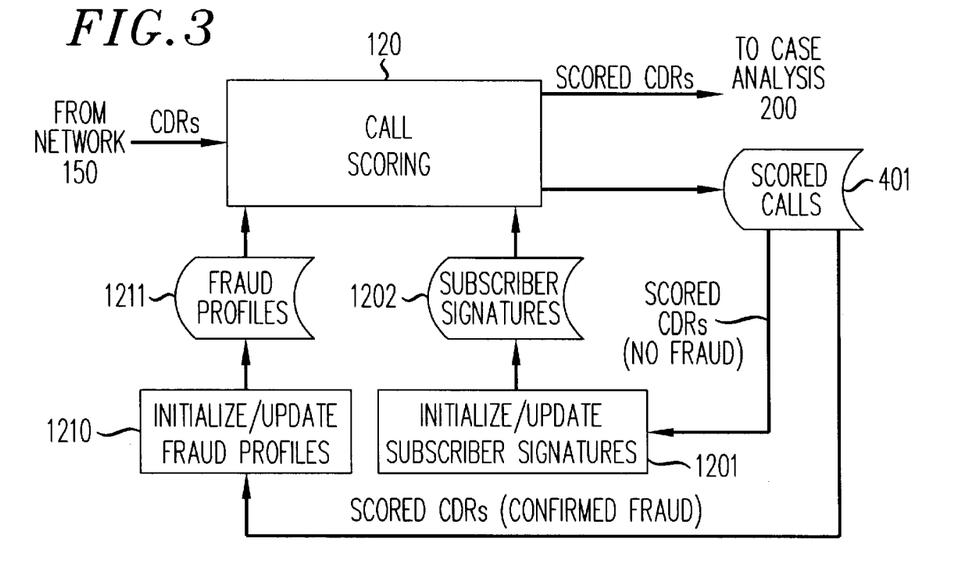
FIG. 3 is a simplified block diagram illustrating how call scoring is implemented according to one embodiment of the invention.

Referring to FIG. 3, a more detailed description is now provided for call scoring function 120 from FIG. 1. As previously described, call scoring function 120 supplies fraud score information for calls made in telecommunications network 150 so that appropriate recommendations can be generated for responding to suspected fraudulent activity.

More specifically, call scoring function 120 can be implemented as further illustrated in the exemplary embodiment shown in FIG. 3. In general, scoring is based on subscriber behavior analysis wherein a signature (stored in block 1202) representative of a subscriber's calling pattern and a fraud signature (stored in block 1211) representative of a fraudulent calling pattern are used to determine the likelihood of fraud on a particular call. Scored call information is then stored (block 401) for later retrieval and use in the iterative and continuous updating process as well as forwarded for case analysis (200) as will be described below in more detail.

As shown, call detail records are supplied from network 150 to call scoring function 120. A subscriber's signature may be initialized as shown in block 1201 using scored call detail records from calls that have not been confirmed or suspected as fraudulent. Initialization may occur, for example, when a subscriber initially places one or more calls. As further shown in block 1201, stored subscriber signatures from block 1202 can then be updated using newly scored call detail records from subsequent calls that are not confirmed or suspected as fraudulent. As such, a subscriber's signature can adapt to the subscriber's behavior over time.

It should be noted that initialization of a subscriber's signature can also be based on predefined attributes of legitimate calling behavior which may be defined by historical call records and the like. In this way, subscription fraud can be detected more readily because a legitimate subscriber's signature, even at the very early stages of calling activity, can be correlated with the expected (or predicted) behavior of legitimate callers. As such, any immediate fraudulent calling behavior on a new account, for example, will not provide the sole basis for initializing the subscriber signature.

It should also be noted that a subscriber signature may monitor many aspects of a subscriber's calling behavior including, but not limited to: calling rate, day of week timing, hour of day timing, call duration, method of billing, geography, and so on. Consequently, a signature may be derived from information that is typically contained within the call detail records, such as: originating number; terminating number; billed number; start time and date; originating location; carrier selection; call waiting indicators; call forwarding indicators; three-way calling/transfer indicators; operator assistance requests; and network security failure indicators, to name a few. The particular elements to be used for establishing and updating a subscriber signature may depend on the type of network (e.g., wireline, wireless, calling card, non-telecommunications, etc.), the particular scoring method being used, as well as other factors that would be apparent to those skilled in the art.

Generally, each call will be scored depending on how the call compares to the subscriber's signature retrieved from block 1202 and how it compares to a fraud signature retrieved from block 1211. By way of example, fraud signatures can be initialized and updated (block 1210) using scored call detail records from confirmed or suspected fraudulent calls. In a simplified example, a high fraud score is generated if the call details represent a suspicious deviation from known behavior and a low fraud score is generated if the call details represent highly typical behavior for the subscriber account in question. In addition to providing an overall fraud score as output from call scoring function 120, the relative contributions of various elements of the call to the fraud score should also be included, the use of which will be described in more detail below relating to case analysis. For example, contributions of the following elements may be included for subsequent case analysis: day of week; time of day; duration; time between consecutive calls; destination; use of call waiting; use of call forwarding; use of three-way calling; use of operator services; origination point; use of roaming services (wireless only); number of handoffs during call (wireless only); appearance of network security alert; carrier selection; and use of international completion services. Again, this listing is meant to be illustrative only and not limiting in any way.

Because call scoring is carried out on a customer-specific and call-by-call basis, a more precise fraud score can be obtained that is more indicative of the likelihood of fraud while reducing the amount of false alarms (i.e., "false positives"). Furthermore, to accurately perform call scoring on a call-by-call basis, those skilled in the art will recognize that one suitable implementation would be to execute the above-described functions using a real-time processing platform. One such exemplary real-time processing platform is Lucent Technologies' QTM™ real-time transaction processing platform, which is described in an article by J. Baulier et al., "Sunrise: A Real-Time Event-Processing Framework", Bell Labs Technical Journal, Nov. 24, 1997, and which is herein incorporated by reference.

It will be apparent to those skilled in the art that many different call scoring techniques may be suitable for implementing the functionality of call scoring function 120 as described above. In particular, call scoring techniques based on statistical analysis, probabilistic scoring, memory-based reasoning, data mining, neural networking, and other methodologies are known and are contemplated for use in conjunction with the illustrative embodiments of the invention described herein. Some examples of these methods and techniques are described in Fawcett et al., "Adaptive Fraud Detection", Data Mining and Knowledge Discovery 1, 291–316 (1997) and U.S. Pat. No. 5,819,226, "Fraud Detection Using Predictive Modeling", issued Oct. 6, 1998, each of which is herein incorporated by reference.

Figure 4:
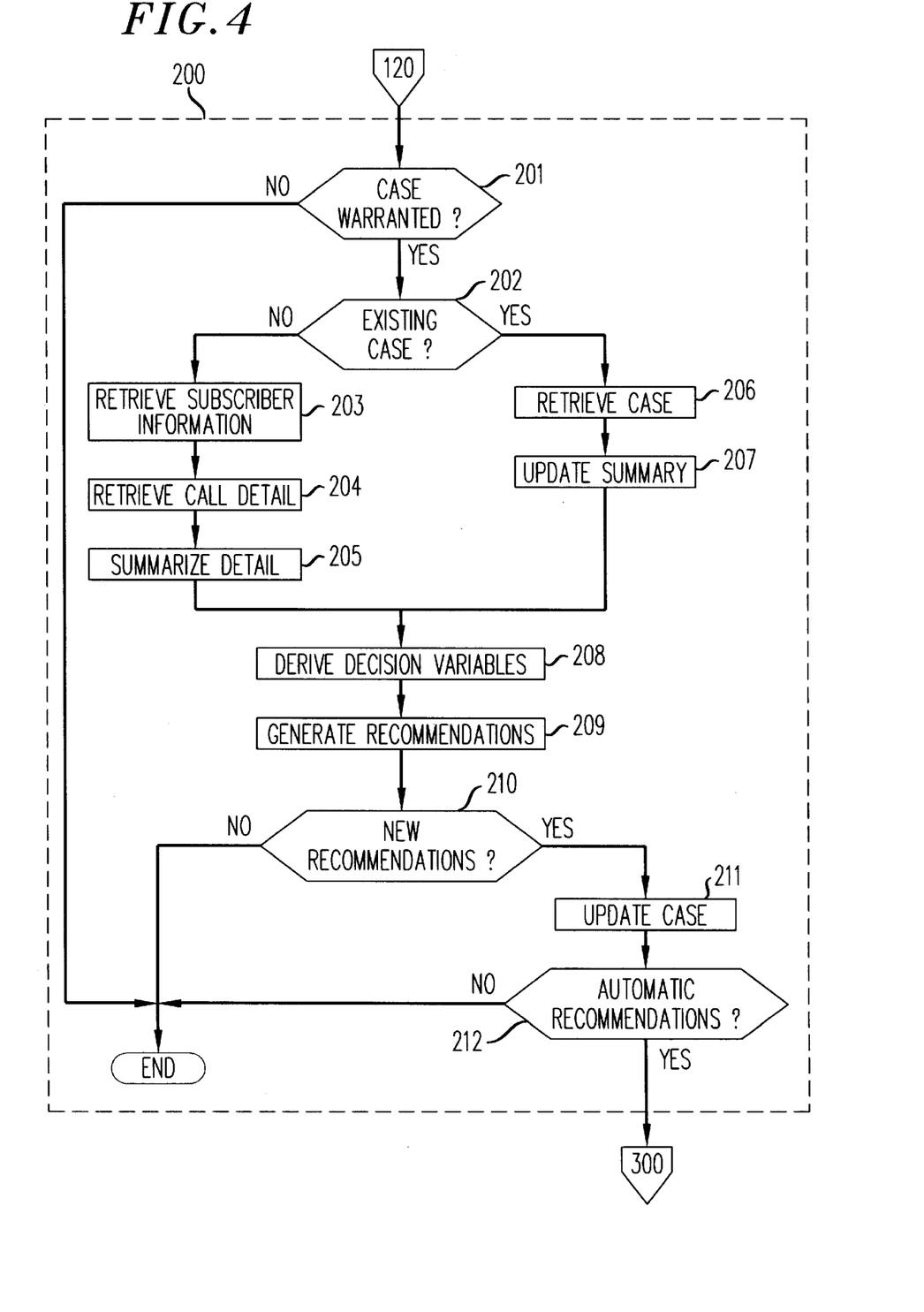
FIG. 4 is a simplified flowchart of the case analysis process according to one illustrative embodiment of the invention.

FIG. 4 shows one illustrative embodiment of case analysis function 200 from FIG. 1. As shown in step 201, details associated with a previously scored call are reviewed to determine whether the call warrants the opening of a new fraud case or addition of the call to an existing case. In particular, the fraud score generated by call scoring function 120 for a particular call and other predetermined variables, such as contributions of specific elements to the fraud score, are reviewed to determine whether the call is "interesting" from a fraud perspective. A call may be "interesting" for any number of different reasons including, but not limited to: a fraud score that exceeds a predetermined (e.g., configurable) value; a fraud score that indicates the culmination of a change in score of a prescribed amount over a prescribed number of calls; an indication of an overlap in time with a previous call (i.e., a "collision"); an indication of a change in origination point between two calls that is impossible for one subscriber to make given the time between those calls (i.e., a "velocity violation"); or being a member of an existing case.

Figure 5A:
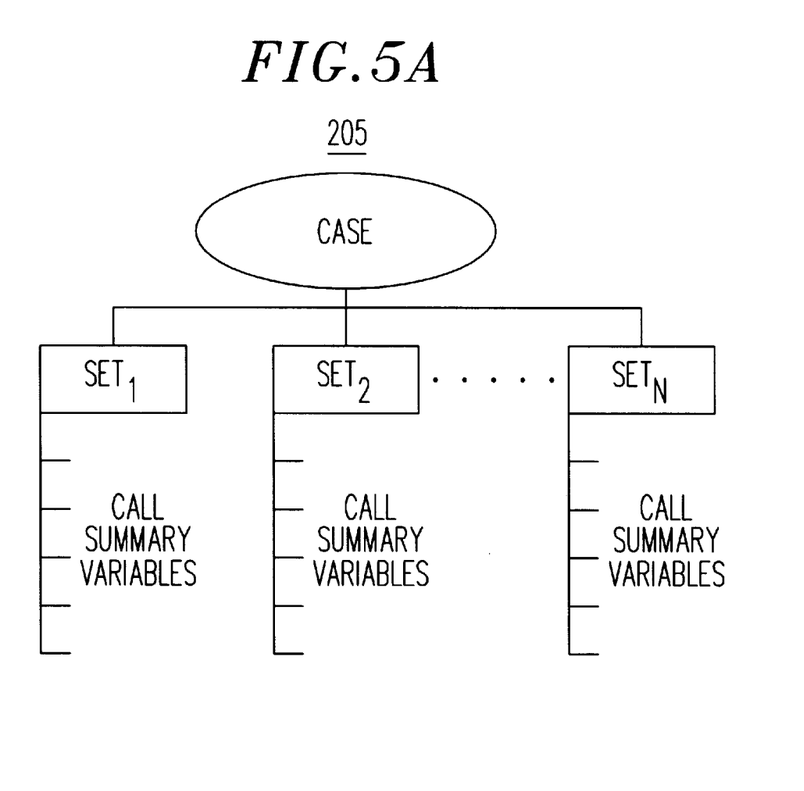
FIG. 5A is a simplified block diagram illustrating the step of summarizing case detail according to the embodiment shown in FIG. 4.

If a scored call record is determined to be interesting, a check is made in step 202 to see if there is an existing case on the related account. If no case is found, a new case is created by: 1) retrieving, in step 203, background information on the subscriber account which is stored in the system (see block 403 in FIG. 1); 2) retrieving scored call detail for the account in step 204; and 3) summarizing the scored call detail in step 205. In order to summarize the scored detail in step 205, the call detail records must first be categorized and then each category must be characterized according to predetermined variables. As shown in FIG. 5A, call detail records are first categorized into a plurality of groups or sets, e.g., $SET_1$, $SET_2$ through $SET_N$, which can be classified, for example, as innocuous, suspicious and indeterminate sets. Initial categorization is based on fraud scores, wherein each call detail record is placed into one of the sets based on its fraud score as compared to established values or thresholds defining the categories. Automatic adjustments to this categorization can be made by considering other factors, such as originating location and dialed number to name a few. For example, if a strong majority of call detail records in the innocuous set contain a given highly typical originating location or dialed number, then one possible adjustment is to move all call records having the same attributes in the other sets to the innocuous set. The sets are then characterized by tabulating call summary variables within each set. In particular, a number of call summary variables may be derived for the case and also for individual sets (e.g., innocuous, suspicious, indeterminate) within a case. The table in FIG. 5B shows one exemplary list of call summary variables that may be useful for case analysis. As shown, variables 410 ("FirstAlertAt" and "CaseScore") represent variables that pertain to the entire case. For example, The "FirstAlertAt" would be used to provide a time when the first high scoring call (e.g., suspected fraud) occurs for that case, regardless of the particular category the call is initially placed in. "CaseScore" may be used to provide an overall case score for the case based on the individual call scores within the case, again regardless of particular category within the case.

The remaining variables shown in FIG. 5B are applicable, in this illustrative example, to a particular set within the case, e.g., the innocuous, suspicious, and indeterminate sets. The explanations for each call summary variable are provided in the description field of the table. As shown, the set-dependent call summary variables can be characterized into two types of variables. The first grouping of call summary variables 420, starting with "Number of Calls" through "Hot Number Count", all address a summing type operation in which a count or percentage is maintained for a particular element of the call. Using call summary variable 421 ("Hot Number Count") as an example, this value would represent the total number of calls within a given set in which the called number is a member of a predetermined (and selectable, editable, etc.) "Hot Number" list. Those skilled in the art will readily understand the significance and use of "hot numbers".

The remaining call summary variables 430, starting with "Day Score Dist" through "International Score Dist", all address the contribution distribution of a specific element or elements to the fraud score within that set. For example, call summary variable 431 ("Hour Score Dist") represents how the "hour of the day" in which calls in the set were placed influenced or contributed to the fraud score. It should be noted that the call summary variables listed in the table in FIG. 5B are only meant to be illustrative and not limiting in any way. Other call summary variables may be selected to characterize a set, depending on several factors such as network type, transaction type, and so on.

Referring again to FIG. 4, if an existing case is found in step 202, then the case is subsequently retrieved in step 206 and the summary of the case, e.g., call summary variables from FIG. 5B, are updated with information from the current call. Based on either a newly created summary (steps 203–205) or an updated summary (steps 206–207), the system calculates a set of decision variables as shown in step 208. More specifically, decision variables are used in the determination of whether certain conditions have been met, thereby providing the basis for generating recommendations for responding to suspected fraudulent activity in the network. The table in FIG. 6 shows one exemplary list of decision variables that may be useful for case analysis according to the principles of the invention.

Figure 6:
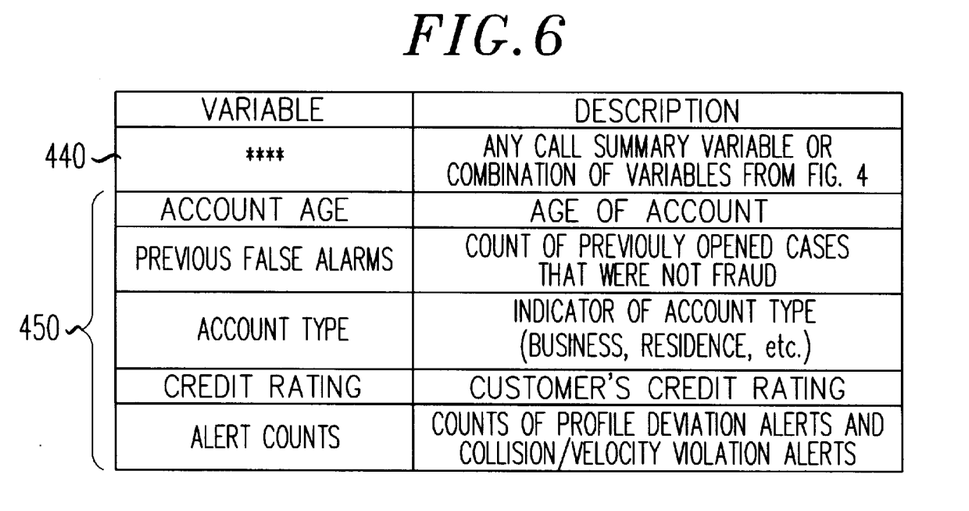
FIG. 6 is an exemplary listing of decision variables that can be used according to the principles of the invention.

As shown in FIG. 6, decision variable 440 is described as being any of the call summary variables from FIG. 5B or any manipulation of one or more of the call summary variables, such as by ratios, mathematical operations, and so on. For example, any of call summary variables 410, 420, or 430 may individually constitute a decision variable for determining an appropriate recommendation for responding to fraud. Another example of a suitable decision variable could be the combination of two or more of the call summary variables in some predetermined manner, e.g., a ratio of the number of calls in which call forwarding was applied ("CF Count") to the total number of calls in the set ("Number of Calls"). The selection of applicable decision variables may again be dependent on the type of network, type of transactions, as well as other factors determined to be applicable. Additional decision variables 450 can also be used to provide additional information that may be helpful in analyzing fraudulent activity to determine appropriate recommendations. For example, "AccountAge", "PreviousFalseAlarms", "AccountType", "CreditRating", and "AlertCounts", each of which is described in the table shown in FIG. 6, may be used. It should be noted that the decision variables listed in the table in FIG. 6 are only meant to be illustrative and not limiting in any way. Other decision variables will be apparent to those skilled in the art given the particular network type, transaction characteristics, and so on.

Figure 7:
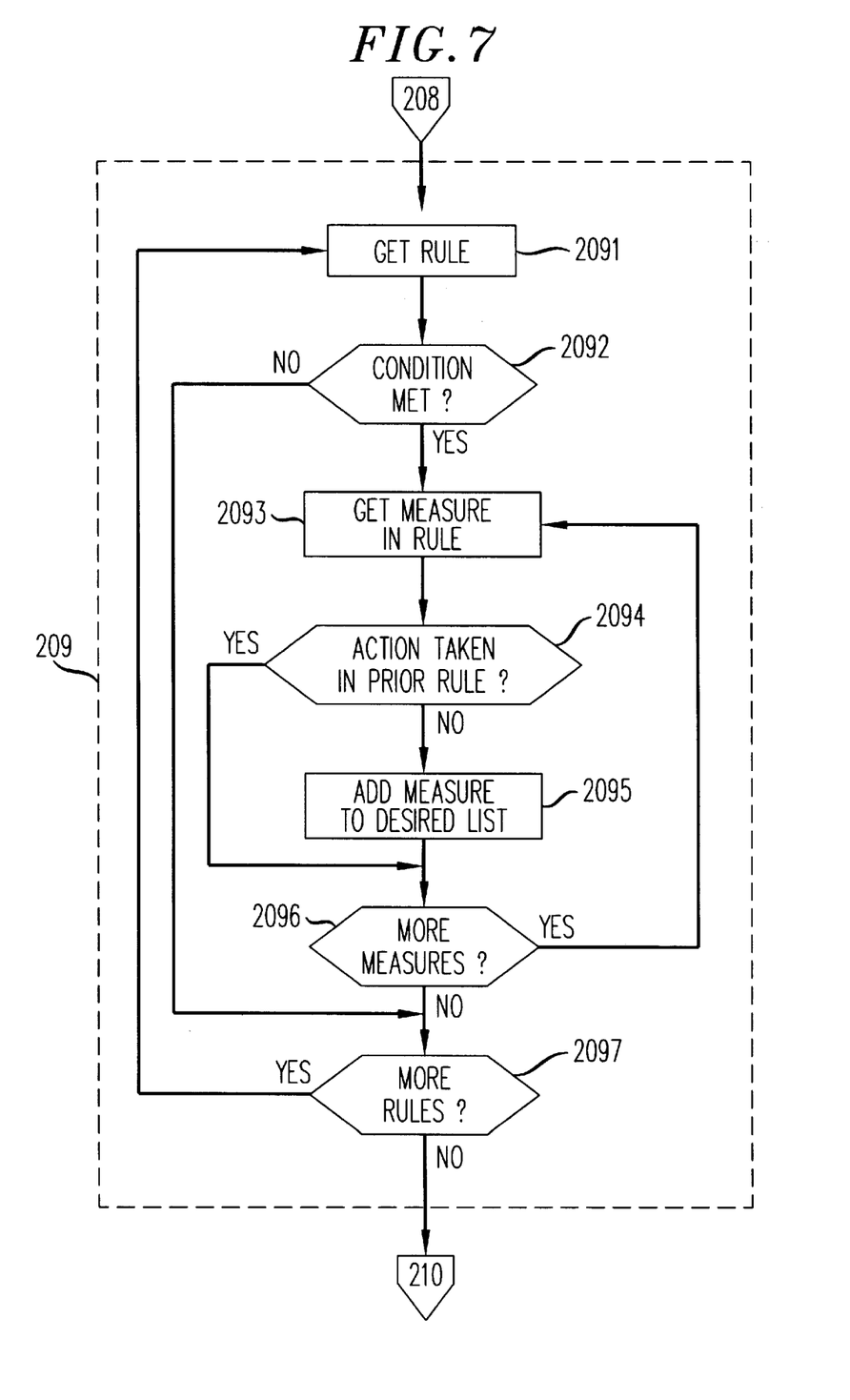
FIG. 7 is a simplified flowchart of the process for generating recommendations for responding to suspected fraudulent activity according to one illustrative embodiment of the invention.

Referring again to FIG. 4, the system then generates, in step 209, one or more recommendations for responding to fraud that may be occurring on an account. FIG. 7 shows one exemplary embodiment of the steps involved in generating recommendations according to the principles of the invention.

A brief overview of the terminology will be helpful to understanding the steps shown in FIG. 7. As described herein, a rule is defined as including a "condition" and a list of one or more "measures". A "condition" can be a Boolean expression that supports comparisons among decision variables (defined in FIG. 6) and predetermined values or constants. In one of its simplest forms, the Boolean expression may use standard Boolean operators, such as AND, OR, NOT, as well as precedence. A single "measure" identifies an action (e.g., block services or block market), parameters associated with the action (e.g., call forwarding for the block services example, or Market 25 for the block market example), as well as a flag as to whether the measure should be carried out automatically. Generally, rules can be modified by the system user (e.g., service provider) depending on given fraud management requirements for the network.

Referring to step 2091 in FIG. 6, the system retrieves a list of rules, and processes each rule according to a hierarchy that may be simple, such as first to last, or by some predefined schema. The condition for that rule (e.g., CFcount/numcallsinset>0.25) is then tested using the applicable decision variables (FIG. 6) specified for that condition. This is depicted in step 2092. If the rule's condition is met, a measure associated with the particular rule is then retrieved in step 2093. As shown in step 2094, if there has been no prior rule which calls for the same action (e.g., Block Services) as that identified in the retrieved measure (from step 2093), then the retrieved measure is added to the list of desired measures in step 2095. If the action has already been required by a previous rule, then the measure is ignored. In this way, precedence is established among rules in the case of conflicting directives. The next step is to determine whether there are more measures associated with the rule as shown in step 2096. If so, then steps 2093–2095 are repeated for all measures in the rule. If there are no other measures associated with the particular rule (retrieved in step 2091), then the system checks for other applicable rules in step 2097. If there are additional rules, then the process described above in steps 2091–2096 is repeated. Once there are no more applicable rules, then the system returns to step 210 in FIG. 4.

Referring again to step 2092, if the rule's condition is not met, then the system examines whether there are more rules in step 2097 and, if so, then the process starts all over again with step 2091. If there are no more rules, then the actions associated with step 210 and subsequent steps in FIG. 4 are processed as described below.

Figure 8:
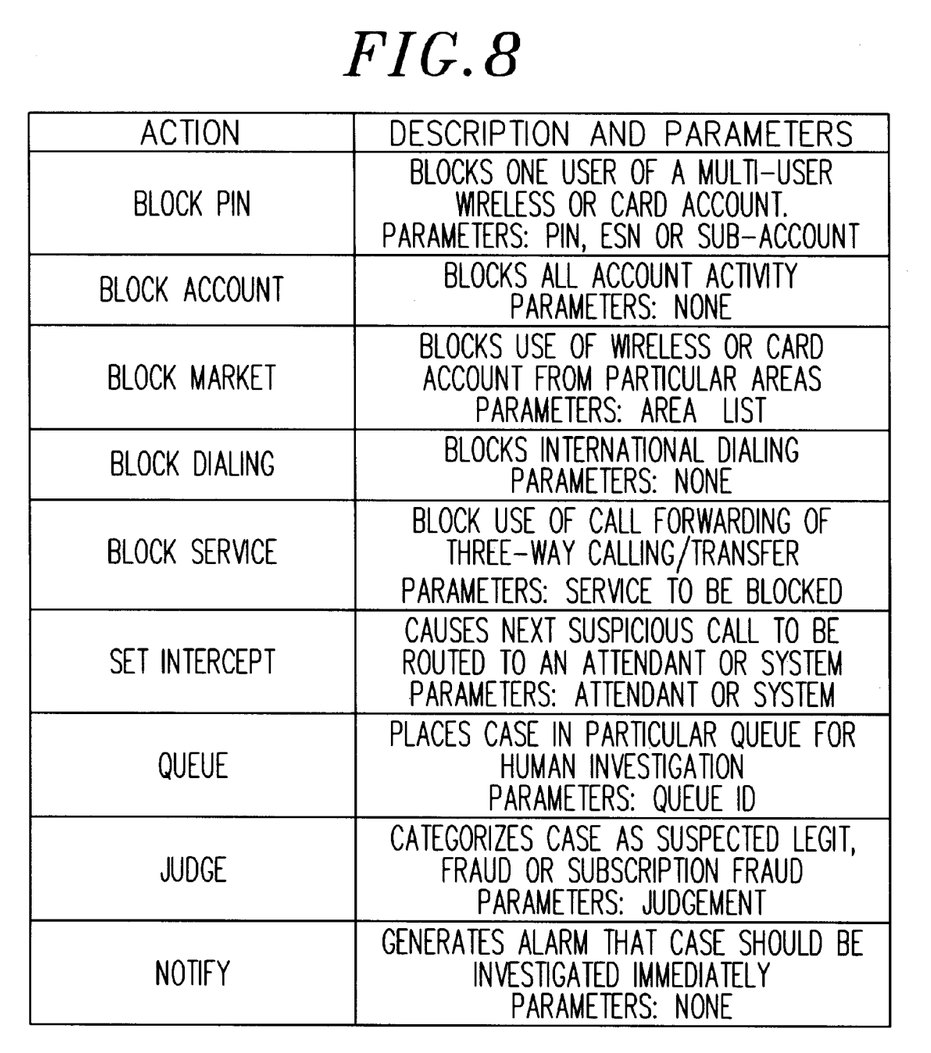
FIG. 8 is an exemplary listing of prevention measures that can be implemented according to the principles of the invention.

As a result of the processing that takes place in the steps illustrated in FIG. 7, one or more recommended measures are automatically generated to respond to suspected fraud. Examples of some actions found in recommended measures are shown in FIG. 8. For example, a recommended measure may be to block all account activity (where the action is "Block Account"), or to block only international dialing (where the action is "Block Dialing" and the associated parameter is "international"), or to block a particular type of service, e.g., call forwarding. It should be noted that this list of recommended actions in FIG. 8 is only meant to be illustrative and not limiting in any way.

It is important to note that the appropriate recommendation can be automatically generated as a function of call-by-call scoring, application of appropriate rules based on the scoring, selection of appropriate call summary variables and decision variables, and so on. As such, the automatically generated recommendations correspond to the call-by-call scoring process such that the recommendations are more precisely targeted to the specific type of fraud that is occurring on the account. For example, most fraud detection and prevention systems are only able to detect the presence of fraud, and only with varying levels of accuracy. Once fraud is detected, these systems typically refer the case for manual investigation. Prevention measures, if they exist at all, are not at all tailored to the type of suspected fraud. By contrast, the fraud management system according to the principles of the invention not only detects fraud but also collects information about the particular characteristics of that fraud. As a result, the recommended fraud responses are tailored to the specific type of fraud that is occurring.

As an example, if case analysis determines that the most significant contribution to a high fraud score is related to the use of call forwarding, then an appropriate recommended fraud response can be to shut down the call forwarding service on that account instead of shutting down all service on that account. In this way, fraud losses can be minimized or eliminated while maintaining service to the legitimate subscriber. Moreover, a recommendation to disable call forwarding may be carried out automatically using provisioning features within the network.

Returning to FIG. 4, the recommendation or recommendations generated in step 209 are compared, in step 210, to recommendations that were previously given for the case. If the recommendations generated from step 209 are not new, then the call analysis process ends for that particular call. If the recommendations are new, then the case is updated with the new recommendations in step 211. If any of the new recommendations are of the type to be carried out automatically as determined in step 212, then appropriate implementation actions can be taken accordingly. For example, recommended actions can be implemented automatically via provisioning function 300 (FIG. 1) in the telecommunications network as previously described.

In sum, the automatic generation of recommendations according to the principles of the invention is predicated on a programmable rules-based engine (e.g., rules can be reprogrammed). Additionally, it is important to remember that the process steps described above in the context of FIGS. 1–8 can all be carried out on a call-by-call basis in the network. Consequently, the rule-based engine is an adaptive system that is used to develop a history of cases, decision criteria and final outcomes on a call-by-call basis in the network. As such, the fraud management system and method according to the principles of the invention provides service providers with a fraud management system which goes well beyond detection that can be customized according to user-defined policies, subscriber behaviors, and the like.

As described herein, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should also be noted that the foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the drawing may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a "processor" or "controller" should not be construed to refer exclusively to hardware capable of executing software, and may implicitly include, without limitation, digital signal processor ASP) hardware, read-only memory (ROM) for storing software, random access memory (RAM), and non-volatile storage. Other hardware, conventional and/or custom, may also be included. Similarly, any switches shown in the drawing are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

What is claimed is:

1. A computer-implemented method for managing fraud in a telecommunications network, comprising the step of:

automatically generating one or more recommendations for responding to suspected fraudulent activity in the telecommunications network, wherein the recommendations are derived as a function of calls scored for the likelihood of fraud, and wherein the recommendations correspond to attributes of the suspected fraudulent activity so that a recommended response to the suspected fraudulent activity is targeted to the type of fraud that is occurring.

2. The computer-implemented method of claim 1, wherein scoring is done on a call-by-call basis.

3. The computer-implemented method of claim 2, further comprising the steps of:

receiving call detail records which have been scored to identify potentially fraudulent activity, wherein a scored call detail record provides an indication of the contribution of a plurality of predetermined call variables to the fraud score; and initiating a case analysis based on predetermined criteria relating to changes in fraud scores.

4. The computer-implemented method of claim 3, wherein the step of initiating a case analysis comprises the steps of:

a) separating a plurality of scored call detail records, based on fraud scores, into at least a first group representative of non-suspicious activity and a second group representative of suspicious activity;

b) characterizing each group according to predetermined variables and fraud scores for individual calls in the respective groups;

c) generating one or more decision variables based on step b) and subscriber information;

d) applying one or more rules to the one or more decision variables to determine if a predefined condition is met; and e) when a predefined condition is met, recommending one or more prescribed fraud responses corresponding to that condition.

5. The computer-implemented method of claim 4, wherein a fraud score of an individual call is representative of the likelihood of fraud based on the learned behavior of a subscriber comprising a subscriber signature and the learned behavior of fraudulent calling activity comprising a fraud signature.

6. The computer-implemented method of claim 5, wherein the one or more prescribed fraud responses includes prevention measures.

7. The computer-implemented method of claim 6, wherein one of the prevention measures includes implementing provisioning-based fraud prevention.

8. The computer-implemented method of claim 1, wherein the recommendations further correspond to attributes of legitimate activity.

9. The computer-implemented method of claim 8, wherein the recommendations further correspond to subscriber information and attributes associated with a case.

10. The computer-implemented method according to claim 3, wherein the plurality of predetermined call variables are variables selected from the group consisting of day of week, time of day, duration of call, time between consecutive calls, origination, destination, use of special call features, appearance of network security alert, carrier selection, and use of international completion services.

11. The method according to claim 4, wherein a case is capable of being updated on a iterative and adaptive basis as a function of newly scored calls and newly generated fraud response recommendations.

12. The computer-implemented method according to claim 5, wherein the subscriber signature is derived from attributes of calling behavior selected from the group consisting of calling rate, day of week timing, hour of day timing, call duration, method of billing, and geographical associations.

13. The computer-implemented method according to claim 5, wherein the attributes of calling behavior are derived from information in call detail records.

14. The computer-implemented method according to claim 5, wherein the fraud signature is derived from attributes of calling behavior associated with suspected and confirmed fraudulent calls.

15. The computer-implemented method of claim 5, wherein suspected fraudulent activity is indicated by factors selected from the group consisting of a fraud score that exceeds a predetermined value, a fraud score indicative of a change in fraud score of a prescribed amount over a prescribed number of calls, a collision event indicated by an overlap in time for two or more calls, and a velocity violation event indicated by an inconsistent change in origination point for each of two or more calls given the amount of time between the two or more calls.

16. A computer-implemented method for managing fraud in a network where transactions occur, comprising the step of:

automatically generating one or more recommendations for responding to suspected fraudulent activity in the network, wherein the recommendations are derived as a function of transactions scored for the likelihood of fraud, and wherein the recommendations correspond to selected attributes of the suspected fraudulent activity so that a recommended response to the suspected fraudulent activity is targeted to the type of fraud that is occurring.

17. The computer-implemented method of claim 16, further comprising the steps of:

receiving transaction records which have been scored to identify potentially fraudulent activity, wherein a scored transaction record provides an indication of the contribution of a plurality of predetermined transaction variables to the fraud score; and initiating a case analysis based on predetermined criteria relating to changes in fraud scores.

18. The computer-implemented method of claim 17, wherein the step of initiating a case analysis comprises the steps of:

a) separating a plurality of scored transaction records, based on fraud scores, into at least a first group representative of non-suspicious activity and a second group representative of suspicious activity;

b) characterizing each group according to predetermined variables and fraud scores for individual transactions in the respective groups;

c) generating one or more decision variables based on step b) and subscriber information;

d) applying one or more rules to the one or more decision variables to determine if a predefined condition is met; and e) when a predefined condition is met, recommending one or more prescribed fraud responses corresponding to that condition.

19. The computer-implemented method of claim 18, wherein a fraud score of an individual transaction is representative of the likelihood of fraud based on the learned behavior of a subscriber comprising a subscriber signature and the learned behavior of fraudulent activity comprising a fraud signature.

20. The computer-implemented method of claim 19, wherein the one or more prescribed fraud responses includes prevention measures.

21. The computer-implemented method of claim 20, wherein one of the prevention measures includes implementing provisioning-based fraud prevention in the network.

22. The computer-implemented method of claim 16, wherein scoring is done on a transaction-by-transaction basis.

23. The computer-implemented method of claim 16, wherein the recommendations further correspond to attributes of legitimate transaction activity.

24. The computer-implemented method of claim 23, wherein the recommendations further correspond to subscriber information.

25. The computer-implemented method of claim 24, wherein the recommendations further correspond to attributes associated with a case.

26. A system for managing fraud in a network where transactions occur, comprising:

means for deriving one or more recommendations for responding to suspected fraudulent activity in the network as a function of transactions scored for the likelihood of fraud; and means for automatically generating the one or more recommendations, wherein the recommendations correspond to selected attributes of the suspected fraudulent activity so that a recommended response to the suspected fraudulent activity is targeted to the type of fraud that is occurring.

27. A system for managing fraud in a telecommunications network, comprising:

at least one memory device for receiving, storing, and supplying call detail records that have been scored to identify potentially fraudulent activity, wherein a scored call detail record provides an indication of the contribution to the fraud score of a plurality of predetermined call variables; and a computer processor, coupled to the at least one memory device, for executing programmed instructions to automatically generate one or more recommendations for responding to suspected fraudulent activity in the telecommunications network, wherein the recommendations are derived as a function of the scored call detail records, and wherein the recommendations correspond to selected attributes of the suspected fraudulent activity so that a recommended response to the suspected fraudulent activity is targeted to the type of fraud that is occurring.

28. A system for managing fraud in a telecommunication network, comprising:

a call scoring element responsive to call detail records generated within the network for scoring a call to determine the likelihood of fraud; and a case analysis element responsive to scored call detail records and subscriber account information for analyzing a case of suspected fraud and for automatically generating recommendations for responding to the suspected fraud, wherein recommended fraud responses correspond to attributes of the suspected fraud so that management of the suspected fraud is targeted to the type of fraud that is occurring.

29. The computer-implemented method according to claim 28, wherein the case analysis element includes a programmable rules-based engine for generating recommendations.

30. The system according to claim 28, further comprising a provisioning function for implementing one or more of the recommended fraud responses.

31. The system according to claim 30, wherein the one or more recommended fraud responses are selected from the group of responses consisting of blocking the call, disabling one or more call features for a particular account associated with the suspected fraud, and forwarding a next call on the particular account to an attendant.

* * * * *